(No Model.) 2 Sheets—Sheet 1.

E. B. STIMPSON, 2d & E. B. STIMPSON, 1st.

E. B. STIMPSON, 2d, Executor of E. B. STIMPSON, 1st, Deceased.

FOOT MEASURING MACHINE.

No. 404,994. Patented June 11, 1889.

Witnesses: Inventor:

(No Model.) 2 Sheets—Sheet 2.

E. B. STIMPSON, 2d & E. B. STIMPSON, 1st.
E. B. STIMPSON, 2d, Executor of E. B. STIMPSON, 1st, Deceased.
FOOT MEASURING MACHINE.

No. 404,994. Patented June 11, 1889.

Witnesses:
Fr. Bergengren
John Bicket

Inventor:
Edwin B. Stimpson
Edwin B. Stimpson as Executor
of Edwin B. Stimpson dec'd
by his attorneys.
Brown & Griswold

UNITED STATES PATENT OFFICE.

EDWIN B. STIMPSON, (2d,) OF BROOKLYN, NEW YORK, AND EDWIN B. STIMPSON, (2d,) EXECUTOR OF EDWIN B. STIMPSON, (1st,) DECEASED, LATE OF SAME PLACE.

FOOT-MEASURING MACHINE.

SPECIFICATION forming part of Letters Patent No. 404,994, dated June 11, 1889.

Application filed December 18, 1888. Serial No. 294,024. (No model.)

*To all whom it may concern:*

Be it known that I, EDWIN B. STIMPSON, residing at Brooklyn, in the county of Kings and State of New York, and EDWIN B. STIMPSON, deceased, late of said Brooklyn, of whose estate I, the said EDWIN B. STIMPSON, am executor, have invented a certain new and useful Improvement in Foot-Measuring Machines, of which the following is a specification.

I will describe in detail a foot-measuring machine embodying the improvement, and then point out the novel features in claims.

Figure 1:
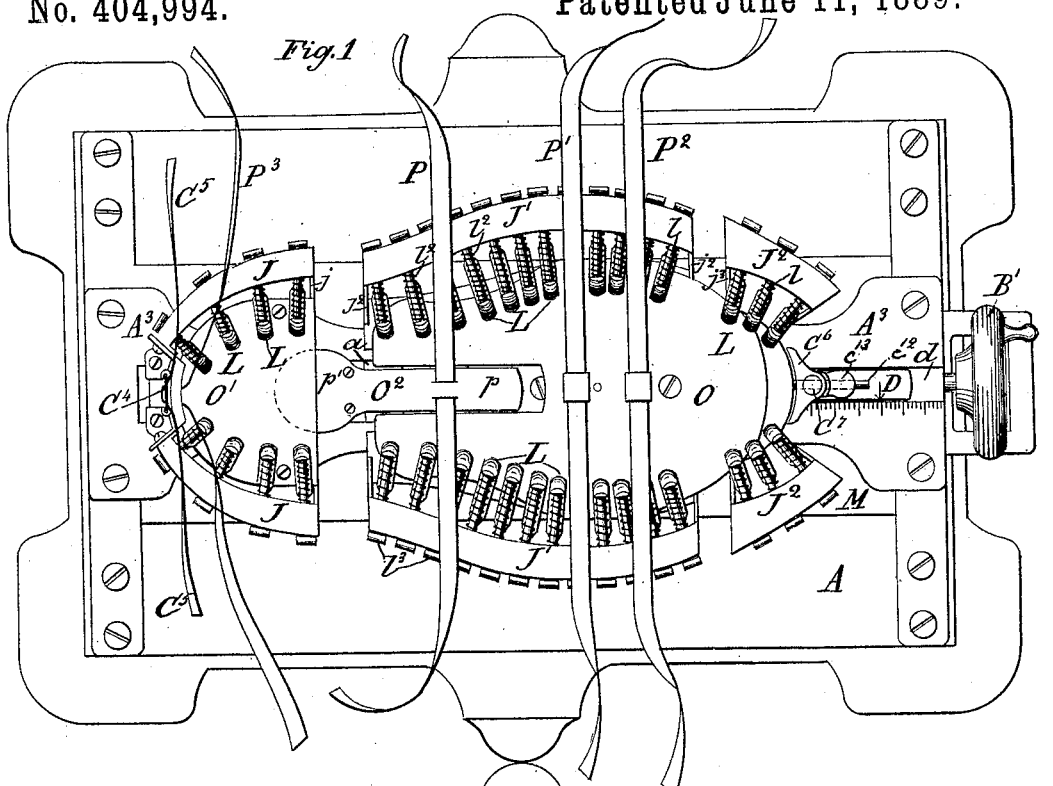
Figure 2:
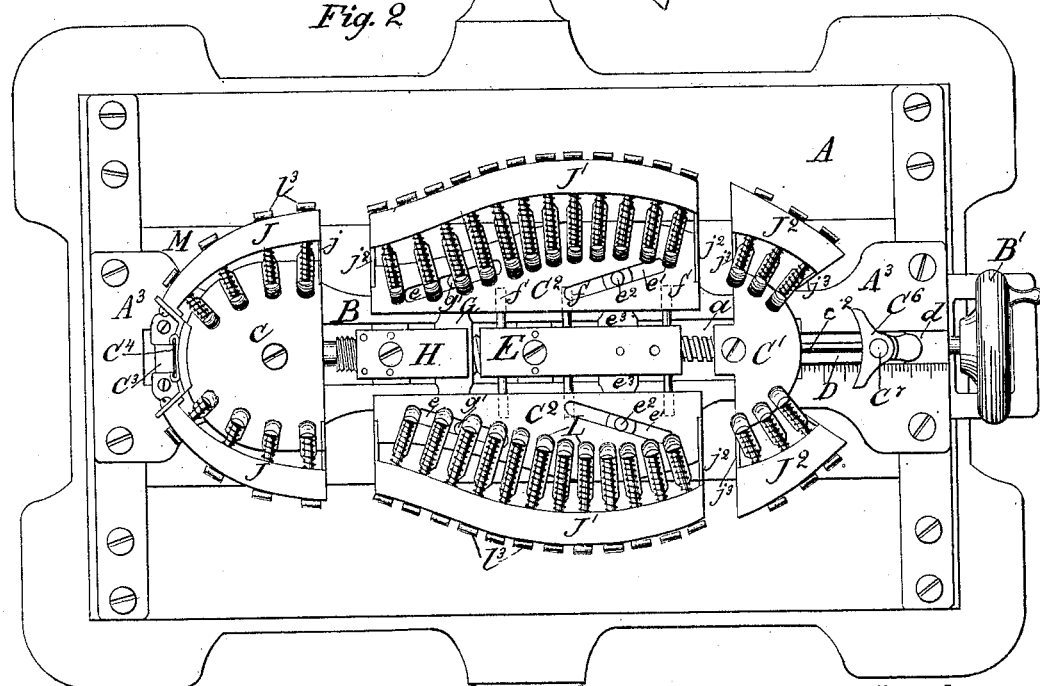
Figure 3:
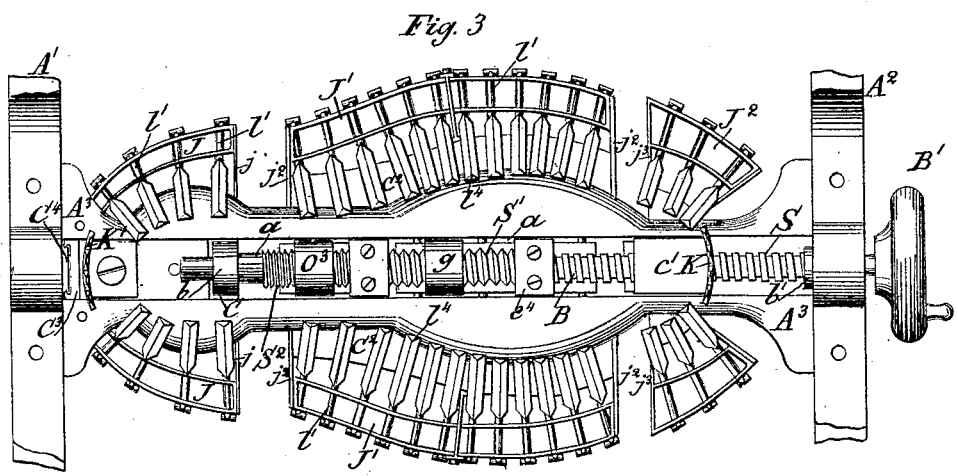
Figure 4:
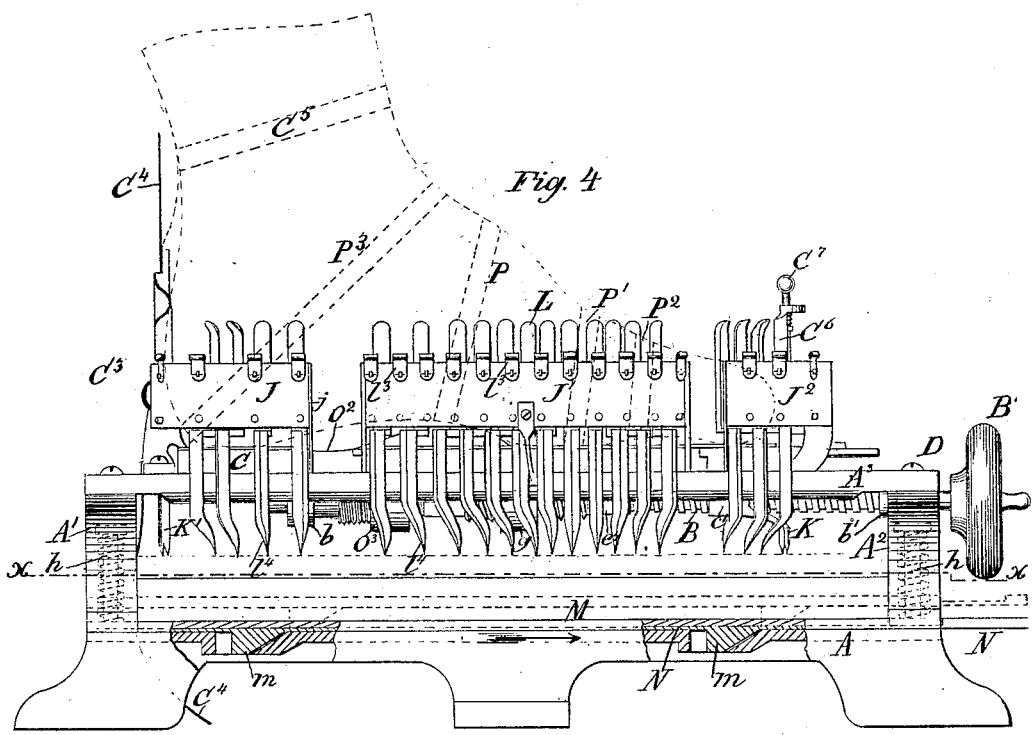

In the accompanying drawings, Figure 1 is a plan or top view of a foot-measuring machine embodying the improvement. Fig. 2 is a similar view showing certain parts removed, in order to more clearly disclose parts concealed in Fig. 1. Fig. 3 is a bottom view looking upward from the plane of the line $x\,x$, Fig. 4. Fig. 4 is a side elevation.

Similar letters of reference designate corresponding parts in all the figures.

A designates the base or bed plate of the machine.

$A'\,A^2$ designate standards or uprights extending from the base or bed plate A and rigidly secured to the latter. Extending longitudinally of the machine, between the uprights $A'\,A^2$ and rigidly secured to the upper end thereof, is a plate $A^3$. This plate is provided longitudinally with a slot $a$. Extending lengthwise through this slot is a screw B. This screw is journaled near one of its ends in the upright or standard $A^2$ of the machine, and upon its outer end I have shown a hand-wheel $B'$, by which it may be rotated. Near its other end the said screw is journaled in a lug or projection $b$, extending downwardly from a heel-plate C. A collar $b'$ upon the shaft B prevents its longitudinal movement in one direction, and the diameter of the screw-shaft upon one side of the lug $b$ is greater than upon the other side of the latter, whereby longitudinal movement of the screw in the other direction is prevented. The screw therefore is capable only of rotary movement.

This machine comprises a fixed heel-plate C, a toe-plate $C'$, movable in the direction of the length of the machine, and side plates $C^2$, which are movable both laterally and in the direction of the length of the machine. The heel-plate C is rigidly secured to the cross bar or plate $A^3$, as shown, by means of a screw $c$ extending through the heel-plate and into said cross-bar. To the rear of said heel-plate, and constituting in effect a part thereof, is an upwardly-extending guide-plate $C^3$. This guide-plate is rigidly secured in the example shown to the cross bar or plate $A^3$. It serves to guide the heel of the foot when the latter is inserted in the measuring-machine and direct it to its proper position on the heel-plate.

$C^4$ designates a resilient metallic tape extending through vertically-extending grooves in the portion $C^3$. This tape may be moved up and down or in the direction of its length, and is scored to measure any height that it is desired that a shoe shall extend upon the ankle. Secured to the measuring-tape $C^4$ is a flexible measuring-tape $C^5$, by which the circumference of the ankle may be taken.

The toe-plate $C'$ has extending downwardly from it a lug or projection $c'$. This lug or projection is provided with a screw-threaded aperture, which engages the screw B. When the screw B is rotated, the toe-plate and the parts connected therewith, to be presently described, will be moved lengthwise of the machine. The toe-plate $C'$ is provided with an upwardly-extending section $C^6$, which section is adjustable in the direction of the length of the machine. A rod $c^2$, rigidly secured near one of its ends to the toe-plate $C'$, passes loosely through a suitable aperture $c^3$ in the section $C^6$. The latter may be slid to and over on this rod. Extending vertically through said section $C^6$ is a spring-actuated bolt $C^7$, and the rod $c^2$ may be provided with suitable notches in its length, into which the bolts $C^7$ will be forced to secure it in different positions into which it may be adjusted.

D designates a tongue extending from the toe-plate $C'$ and into a groove $d$, formed lengthwise of the cross bar or plate $A^3$. Upon the tongue D, I have shown an arrow or pointer, and upon the adjacent surface of the cross-bar $A^3$ a graduated scale. As the toe-plate is moved inwardly or outwardly, the arrow or pointer on the tongue will indicate the length of the foot being measured upon said graduated scale. The object of the adjustable section $C^6$ is to accommodate lasts, it being a well-known fact that lasts are always made longer than the actual length measurement of the foot calls for—as, for instance, if the foot measures six inches in length, the last used would be seven inches in length, or thereabout, and the machine having been adjusted to the proper length of the foot which has been measured, the adjustable section $C^6$ is then moved out one inch, or thereabout, in order to accommodate the last.

As previously stated, the side plates $C^2$ have a movement both lengthwise of the machine and crosswise thereof. These movements are accomplished as follows: Each of the plates is provided in this example with two slots $e$ $e'$. These slots extend at angles to the direction of the length of the machine. The slots $e$ $e'$ upon one of the plates extend in a different direction from those upon the other of the plates, but at the same angle therewith. The slots therefore constitute in effect cam-slots. Into the slots $e'$ extend pins $e^2$, extending upwardly from a cross-bar $e^3$, which latter is provided upon its under side with a bearing $e^4$, within which is received an unscrew-threaded portion of the shaft B. No movement lengthwise of the machine will therefore be imparted to the cross-bar $e^3$ by the rotation of the screw B. The slots $e'$ and pins $e^2$ constitute guides by which the side plates are caused to move sidewise when being moved lengthwise by the screws.

I have shown the side plates $C^2$ as connected together by means of rods $f$, extending between them and extending loosely into suitable apertures in the plates. This arrangement affords provision for the free movement of the plates $C^2$ toward and from each other, while at the same time they will not be disconnected from the rods $f$. The rods $f$ are rigidly secured to a plate E, arranged between the side plates $C^2$ and extending lengthwise of the machine. Secured to this plate upon its under side is a nut $g$. The nut $g$ engages a screw-threaded portion of the screw B.

G designates a cross-bar extending between the side plates $C^2$ and below the same in manner similar to the cross-bar $e^3$. Upon this cross-bar are upwardly-extending pins or projections $g'$, which pins or projections extend into the slots $e$ in the plates $C^2$. Upon the under side of the cross-bar G is a bearing receiving an unscrew-threaded portion of the screw B, whereby when the screw is rotated no motion longitudinally of the machine will be imparted to the cross-bar G, owing to the connection of the non-movable cross-bars $e^3$ G with the cam-slots $e$ $e'$ of the plates $C^2$. When movement is imparted to the plates $C^2$ by means of the screw B engaging the nut $g$, the plates $C^2$ will not only be moved lengthwise of the machine, but will also be moved in the direction of the width of the machine and away from or toward each other, according to the direction in which the screw B is rotated. It will therefore be seen that as the screw B is rotated accommodation is made for feet of different lengths.

J designates frame-like supports secured by means of braces $j$ to the heel-plate C, and also secured to the upright $A^2$. As shown more particularly in Fig. 3, these frame-like supports are hollow.

J' designates other frame-like supports, likewise hollow and secured by means of braces $j^2$ to the side plates $C^2$ of the machine.

$J^2$ designates other frame-like supports, likewise hollow and secured by braces $j^3$ to the toe-plate C'. The frame-like supports J' $J^2$ partake of all the movements of the respective plates to which they are connected.

It will be observed that the shape of the frame-like supports J J' $J^2$ is approximately that of the outline of the human foot or of a last. Mounted in the frame-like supports J J' $J^2$ are yielding fingers L. The portions of the fingers L which are above the plates C C' $C^2$ extend vertically, and their upper ends are outwardly curved to provide for the ready insertion of the foot. Rigidly secured to these fingers are pins or rods $l$ $l'$. These rods extend horizontally through suitably-formed apertures in the frame-like supports J J' $J^2$, through which they may be slid freely to and fro. Springs $l^2$, surrounding the rods $l$ $l'$ and abutting at one of their ends against the fingers L and at the other of their ends against the frame-like supports J J' $J^2$, serve to maintain said fingers normally in a position over the plates C C' $C^2$. When the foot is pressed downwardly in the machine, it contacts with the fingers L, forcing them outwardly, and the number and arrangement of the fingers is such that they will conform accurately to the shape of the foot upon its sides. Stops $l^3$ upon the rods $l$, outside the frame-like supports J J' $J^2$, prevent a too extended inward movement of the fingers L.

The fingers L are provided with downwardly-extending portions $l^4$, which extend for a distance below the cross bar or plate $A^3$, and are shown as inwardly-curved near their lower extremities. The lower ends of the portions $l^4$ of the fingers are pointed, and the points are in the same vertical planes with the portions of the fingers L which extend upwardly above the plates C C' $C^2$. The portions $l^4$ of the fingers are of course moved horizontally with the upper portions of the fingers when the fingers are moved outwardly by the insertion of the foot between them. A line drawn about the pointed ends of the portions $l^4$ of the fingers will therefore be a line conforming accurately to the contour of the foot. If now a piece of paper or other material easily punctured or indented be pressed upwardly against the pointed ends of the portions $l^4$ of the fingers, the contour of the foot will be accurately reproduced by punctures or indentations. Immediately behind the heel and in front of the toe I have shown plates K K', which plates are provided with pointed teeth at their lower extremities. The plate K is connected with the toe-plate C', so as to move therewith. The plate K' is rigidly affixed and has no movement. These plates are employed for the reason that yielding fingers are not necessary at these points. I have shown a convenient means for forcing a piece of paper or other easily perforated or indented material against the points $l^4$ of the fingers, consisting in a plate M, arranged beneath said points. Near the corners of the plate M the same is provided with suitable apertures, through which extend loosely upright pins or studs $h$. (Shown more clearly in dotted outline in Fig. 4.) Springs arranged between heads in the upper ends of the posts or rods $h$ and the plate M tend to always force the plate downwardly.

In order to elevate the plate, I have shown a sliding plate N, which plate is provided upon its under side with cam-like projections $m$. These cam-like projections extend normally through suitable apertures in the base-plate A. When the plate N is moved in the direction of the arrow, Fig. 4, the cam-like projections $m$ ride up on the edges of the apertures in the base-plate, through which they extend, and thus cause the elevation of the plate M.

A piece of felt or other yielding material may be placed upon the top of the plate M, upon which the paper or other material to be punctured or indented may be placed. I have shown more clearly in Fig. 1 a plate O, extending over the side plates $C^2$ and a portion of the toe-plate C'. This plate O is secured to the plate E, and consequently moves to and fro with the toe-plate C' and the side plates $C^2$. In Fig. 1 there is shown more clearly a plate O' upon the top of the heel-plate.

$O^2$ designates a strip of metal, preferably of spring-steel. One end thereof $p$ extends beneath the instep of the foot and is curved to conform to the shape of the shank. The other end, or $p'$, extends between the plate O' and the heel-plate C. This metal piece $O^2$ is secured to a nut $O^3$, (shown more clearly in Fig. 3,) which nut engages a screw-threaded portion of the screw B. This nut has square sides extending into the slot $a$ in the cross-bar $A^3$, which prevents its rotation. The rotation of the shaft B therefore causes the nut $O^3$, together with the metal piece $O^2$, to be moved to and fro lengthwise of the machine. An instep-measuring strap P is connected to the metal piece $O^2$, as shown, by passing through slits formed in said metal piece. Straps P' $P^2$, for measuring the ball of the foot and the toes, are connected to the plate O. A strap $P^3$ is connected to the heel-plate C at the back part of the latter for measuring the heel and across the ankle.

It will be seen that the screw-shaft B has portions provided with screw-threads of different pitch. The portion S of the screw, which engages the nut $c'$ for operating the toe-plate C, has a screw-thread of considerable pitch. The portion S', which engages the nut $g$, has a screw-thread of less pitch, while the portion $S^2$, which engages the nut $O^3$, has a screw-thread of still further reduced pitch. By these arrangements it will be quite clear that the toe-plate will be moved lengthwise of the machine more rapidly than the side plates, and that the metal piece $O^2$ will be moved still more slowly in this direction.

It is advantageous to move the toe-plate fastest, because it is the length of the foot which is to be quickest arrived at, and it is advantageous to move the plate $O^2$, carrying the instep-measuring strap P, more slowly than the plate O, carrying the straps P' $P^2$, because less variations occur in the length of the foot between the instep and the heel than between the instep and the ball of the foot and toes. The arrangement of the straps and the mode of progressing them fore and aft the machine is therefore such as to meet all the requirements of feet of different lengths, as the straps will always be brought into proper position for measuring the respective parts of the foot, whatever the length of the foot.

If desired, felt or other soft or warm material may be secured upon the plates O O', so as to protect the foot being measured from cold.

I have illustrated and described the portions $l^4$ of the fingers as having pointed lower ends; but it is obvious that they need not be pointed, but may be of any suitable shape to cause an impression to be taken when the paper or other material is pressed against them.

What is claimed as the invention, and desired to be secured by Letters Patent, is—

1. In a foot-measuring machine, the combination, with a heel-plate, of frame-like supports upon said heel-plate, a toe-plate, side plates, a screw, connections between the screw and the toe-plate and side plates, whereby when the screw is rotated movement lengthwise of the machine will be imparted to the toe and side plates, frame-like supports movable with said toe and side plates, and spring-actuated fingers loosely mounted in all said supports and adapted to be pressed outwardly upon the insertion of the foot, said fingers having portions extending downwardly below the said plates, substantially as and for the purpose specified.

2. In a foot-measuring machine, the combination, with a heel-plate, of side plates, a toe-plate, frame-like supports adjacent to said heel-plate, a screw, connections between said side plates, the toe-plate, and the screw, whereby when the screw is rotated the side plates and toe-plate will be moved lengthwise of the machine, frame-like supports movable with said side plates and toe-plate, spring-actuated fingers loosely mounted in said frame-like supports and adapted to be moved outwardly upon the insertion of the foot, said fingers being provided with portions extending below said plates, and an upwardly-movable impression-plate below said fingers, adapted when moved upwardly to press paper or other material against the lower ends of said fingers to cause the taking of an impression from the fingers, substantially as specified.

3. In a foot-measuring machine, the combination, with side plates, of a screw for imparting movement thereto, and guides acting on said side plates, whereby when the screw is rotated the side plates will be moved both lengthwise of the machine and widthwise thereof, substantially as specified.

4. In a foot-measuring machine, the combination, with a screw, of a toe-plate, side plates, a metal piece, a connection between the toe-plate and the screw, a connection between the side plates and the screw, a connection between said metal piece and the screw, and guides acting on said side plates, said screw being provided with threads of different pitch, whereby when rotated said toe-plate, side plates, and metal piece will be moved lengthwise of the machine at different speeds and the side plates will be moved by said guides widthwise of the machine, substantially as and for the purpose specified.

5. In a foot-measuring machine, a toe-plate having a movable section adapted to be moved independently of the toe-plate to lengthen or shorten the toe-plate, substantially as specified.

6. In a foot-measuring machine, the combination, with a toe-plate, of a movable section thereof adapted to be moved independently of the toe-plate to lengthen or shorten the toe-plate, and a locking device for securing said section when adjusted, substantially as specified.

EDWIN B. STIMPSON.
     EDWIN B. STIMPSON,
*Executor of Edwin B. Stimpson, deceased.*
Witnesses:
 FREDK. HAYNES,
 ARTHUR H. GAMBLIN.